(12) United States Patent
Akahori

(10) Patent No.: US 7,837,480 B2
(45) Date of Patent: Nov. 23, 2010

(54) ELECTRIC JUNCTION BOX

(75) Inventor: Masahiro Akahori, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/453,377

(22) Filed: May 8, 2009

(65) Prior Publication Data
US 2009/0280661 A1    Nov. 12, 2009

(30) Foreign Application Priority Data
May 9, 2008    (JP) .............................. 2008-123592

(51) Int. Cl.
*H01R 12/00*    (2006.01)
(52) U.S. Cl. ................................... 439/76.2
(58) Field of Classification Search ................ 439/76.2, 439/76.1, 79, 80
See application file for complete search history.

(56) References Cited

U.S. PATENT DOCUMENTS

2008/0200045 A1*   8/2008   Akahori et al. ............ 439/76.2
2009/0253311 A1*  10/2009   Akahori et al. ............ 439/709
2009/0280661 A1*  11/2009   Akahori ..................... 439/76.2

FOREIGN PATENT DOCUMENTS

JP          2005-119331         5/2005

* cited by examiner

*Primary Examiner*—T C Patel
*Assistant Examiner*—Phuong Nguyen
(74) *Attorney, Agent, or Firm*—Edwards Angell Palmer & Dodge LLP

(57) ABSTRACT

An electric junction box, which is arranged at the front in a motor vehicle, having a box body including: an electric connection block partitioned into a plurality of spaces by a plurality of partition walls, the spaces receiving respective cassette blocks and each cassette block being connected to an end of at least one electric wire; and a power supply branching block branching off electric power from a power supply, wherein the electric connection block is arranged at the front side of the motor vehicle in the electric junction box, while the power supply branching block is arranged at the rear side of the motor vehicle in the electric junction box, wherein a power supply connecting part of the power supply branching block is arranged at the rear of the electric connection block, the power supply connecting part being connected to the power supply.

2 Claims, 5 Drawing Sheets

ELECTRIC JUNCTION BOX

BACKGROUND OF THE INVENTION (1) Field of the Invention

The present invention relates to an electric junction box to be mounted on a motor vehicle and so on as a mobile unit.

(2) Description of the Related Art

Generally, a motor vehicle as a mobile unit mounts various electronic instruments such as lamps, for example, a head lamp and tail lamp and motors, for example, a starter motor and motor for an air conditioner.

In order to supply electric power to the various electronic instruments, the motor vehicle arranges junction blocks at appropriate positions. The junction block is composed by integrating various many electric circuit units such as fuses and relays.

The junction block may be called a fuse block, relay box or electric junction box (for example, see Japanese Patent Application Laid-Open No. 2005-119331) as a generic term since the junction block may include fuses, relays and/or busbars. In this specification, such a fuse block, relay box or junction block is called an electric junction box as a generic term.

The electric junction box disclosed in Japanese Patent Application Laid-Open No. 2005-119331 includes: a box body forming an outer shape of the electric junction box; and a wiring block. The box body is made of electrically insulating synthetic resin and formed in a box-shape. The box body includes: a mounting part on which electric components such as relays and fuses are mounted; and a connector fitting part to which connectors of a wiring harness are fit.

The wiring block is received in the box body. The wiring block includes busbars through which electric power is supplied from a battery or electric generator as a power supply and which branches off electric wires to the mounting parts on which the electric components are mounted.

The busbar is made of electrically conductive sheet metal. The busbar includes: a power supply connecting part connected to the battery or electric generator; and a terminal part which is positioned in the mounting part so as to be connected to the electric component such as a relay or fuse when the wiring block is received in the box body.

The wiring block electrically connects the power supply, electric components and electric wires of a wiring harness to each other according to a predetermined pattern, so that the electric junction box electrically connects the power supply, electric components and electronic instruments connected to the respective electric wires of the wiring harness to each other according to a predetermined pattern. Then, the electric junction box supplies electric power supplied from the power supply to the electric components through the wiring harness.

As for the electric junction box disclosed in Japanese Patent Application Laid-Open No. 2005-119331, when the motor vehicle is subjected to a collision at the front face by another motor vehicle on a condition that the electric junction box is arranged at the front in an engine room of a motor vehicle, off course, the motor vehicle is damaged, for example, the box body is crushed, causing that the wiring block is unable to branch off the electric power, that is, the electric power is hardly supplied to the electronic instruments.

SUMMARY OF THE INVENTION

It is therefore an objective of the present invention to solve the above problem and to provide an electric junction box which can maintain to supply the electric power to the electronic instruments even when the motor vehicle equipped with the electric junction box is subjected to a traffic accident.

In order to attain the above objective, the present invention is to provide an electric junction box, which is arranged at the front in a motor vehicle, having a box body including:

an electric connection block partitioned into a plurality of spaces by a plurality of partition walls, said spaces receiving respective cassette blocks and each said cassette block being connected to an end of at least one electric wire; and a power supply branching block branching off electric power from a power supply, wherein the electric connection block is arranged at the front side of the motor vehicle in the electric junction box, while the power supply branching block is arranged at the rear side of the motor vehicle in the electric junction box, wherein a power supply connecting part of the power supply branching block is arranged at the rear of the electric connection block, said power supply connecting part being connected to the power supply.

With the construction described above, since the electric connection block is arranged at the front side of the motor vehicle in the electric junction box and the power supply connecting part of the power supply branching block is arranged at the rear of the electric connection block, therefore when the motor vehicle is subjected to a collision at the front face by another motor vehicle, the electric connection block is crushed in such a manner that the spaces between the respective partition walls are crushed. Therefore, a possible damage of the power supply branching block, in particular, a possible damage of the power supply connecting part can be reduced. Accordingly, even when the motor vehicle equipped with the electric junction box is subjected to a traffic accident, the electric power can be maintained to be supplied to the electronic instruments.

An electric component for connection and the end of at least one electric wire are connected to the cassette block.

With the construction described above, since the cassette block attaches electric components for connection such as relays and connectors and ends of the electric wires, therefore when the electric connection block is crushed, the cassette blocks, the electric components for connection, and the ends of the electric wires are simultaneously crushed. Therefore, mechanical strength of the electric connection block is reduced and therefore the electric connection block is easily crushed in comparison with a case in which the cassette block is formed integrally with the box body. That is, since the electric connection block is formed so as to be easily crushed to some extent, therefore when the motor vehicle equipped with the electric junction box is subjected to a traffic accident, the power supply branching block can be securely prevented from being damaged.

DESCRIPTION OF AN EXEMPLARY EMBODIMENT

Figure 1:
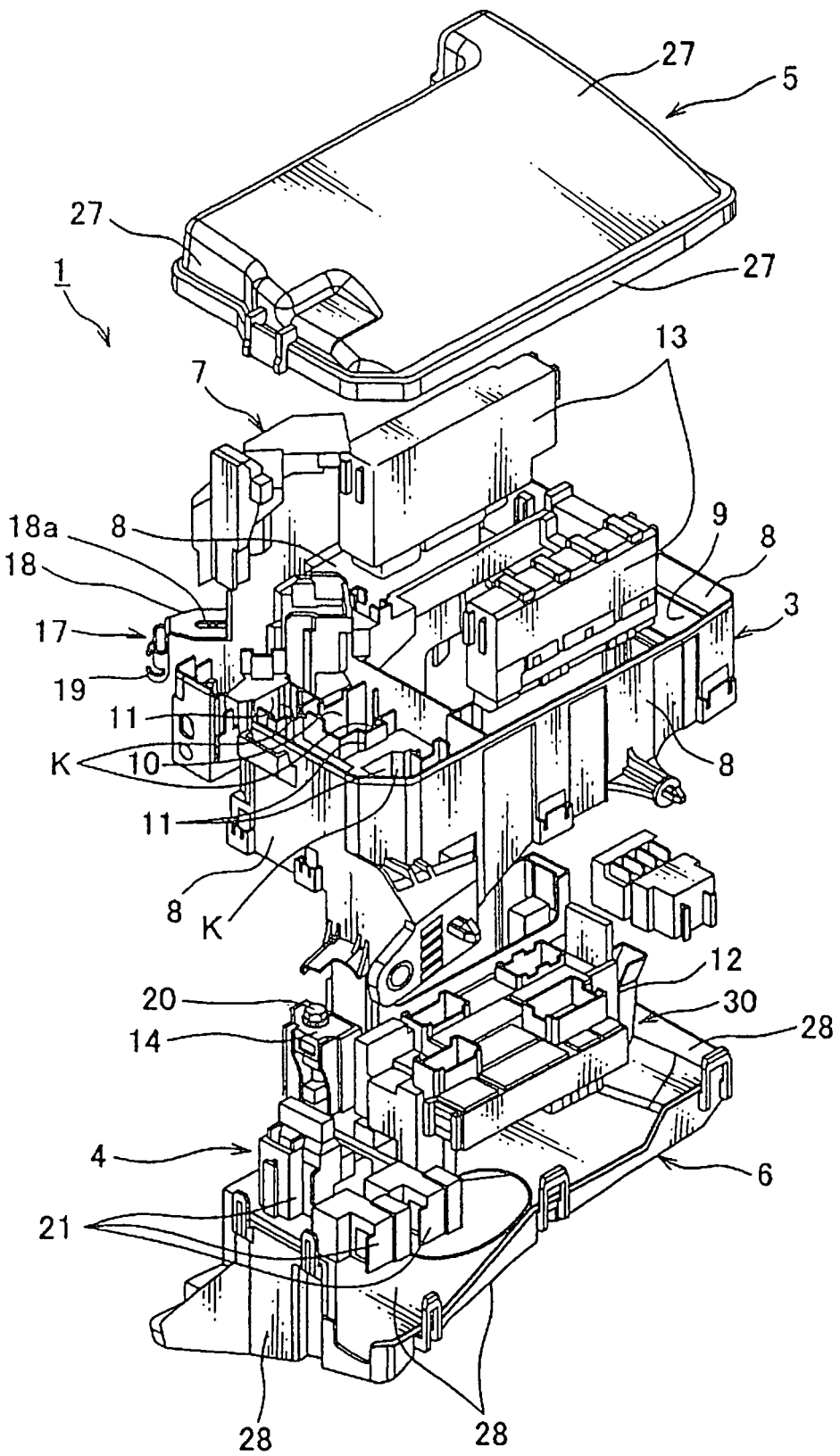
FIG. 1 is an exploded perspective view of an electric junction box according to a preferred embodiment of the present invention.
Figure 2:
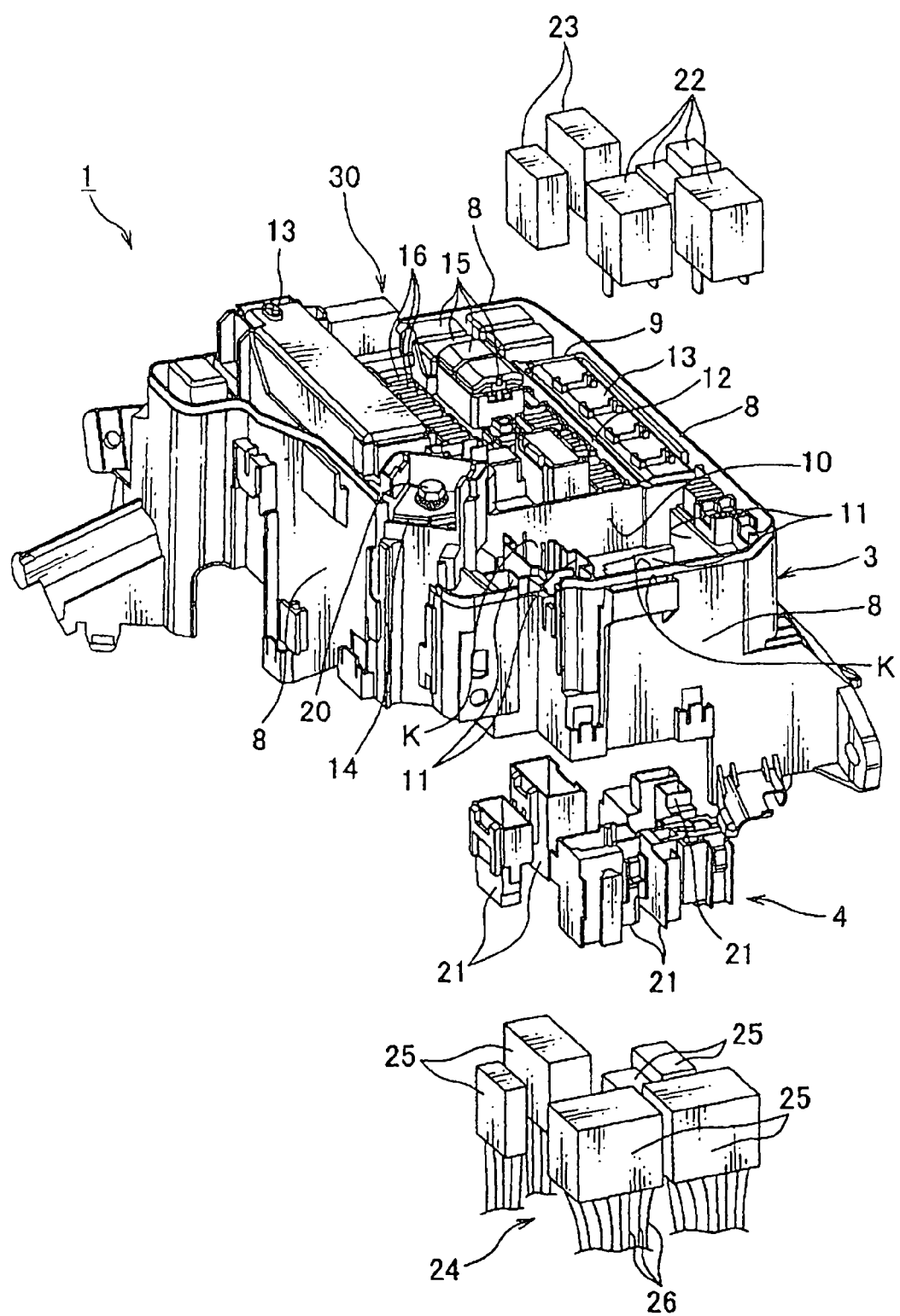
FIG. 2 is a perspective view illustrating a box body of the electric junction box shown in FIG. 1.
Figure 3:
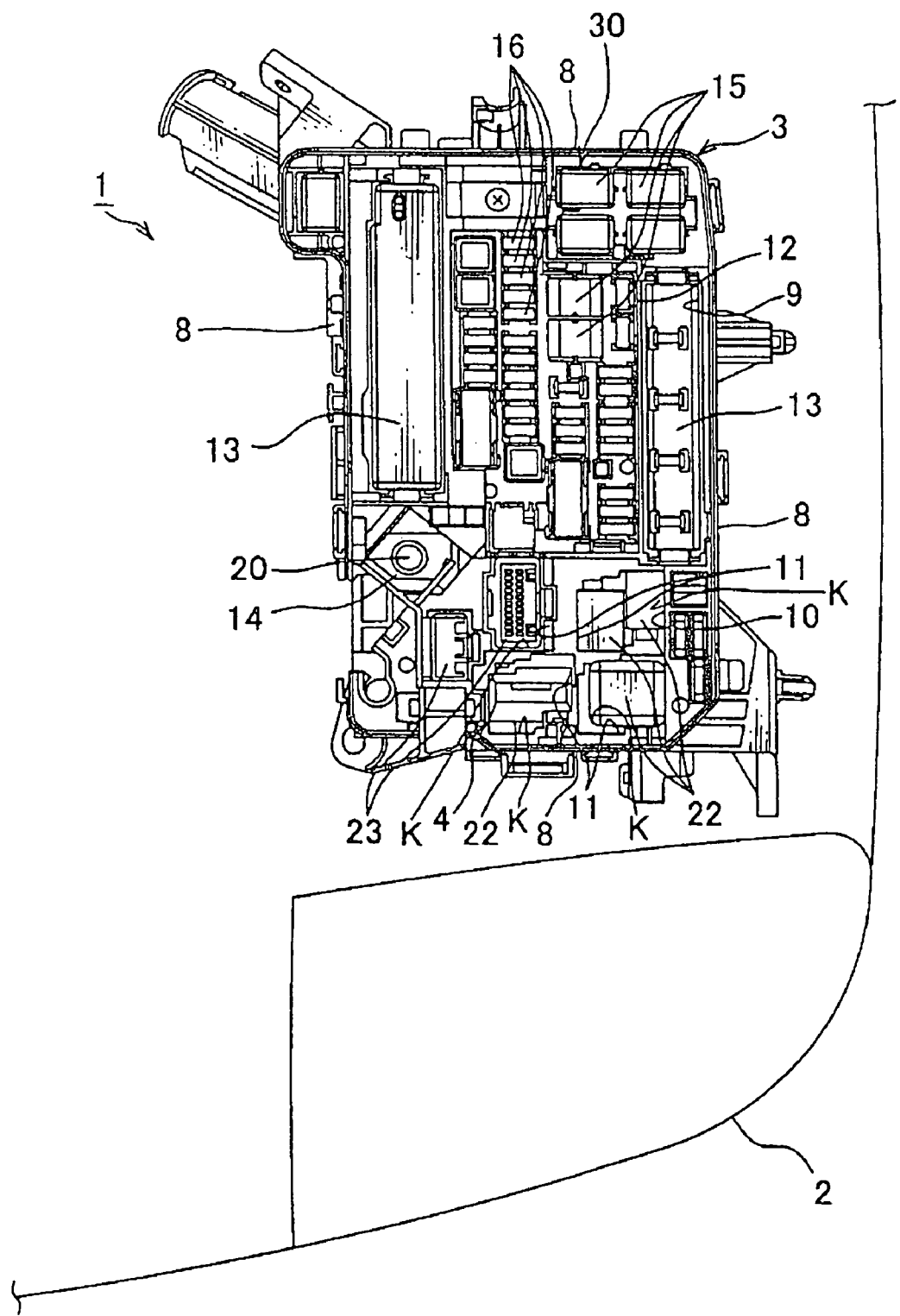
FIG. 3 is a schematic view illustrating a state when the box body of the electric junction box shown in FIG. 1 is mounted on a motor vehicle.

In the following, an exemplary embodiment of the present invention will be explained with reference to FIGS. 1-5. The electric junction box 1 according to the exemplary embodiment shown in FIG. 1 is arranged at the front in a motor vehicle as a mobile unit, for example, arranged in an engine room of the motor vehicle as shown in FIG. 3. In an example shown in FIG. 3, the electric junction box 1 is arranged at the rear of a head lamp 2 of the motor vehicle.

As shown in FIG. 1, the electric junction box 1 includes a box body 3, connection block 4, upper cover 5, lower cover 6, and side cover 7.

The box body 3 is made of electrically insulating synthetic resin and molded by known injection molding. As shown in FIG. 2, the box body 3 is formed in a box-shape with a plurality of outer walls 8 continuing to one another. When the electric junction box 1 is arranged in an engine room of a motor vehicle, an end part of the box body 3 situated at the rear side of the motor vehicle is provided with a branching block attaching part 9. The branching block attaching part 9 is a space formed in the box body 3.

Figure 5:
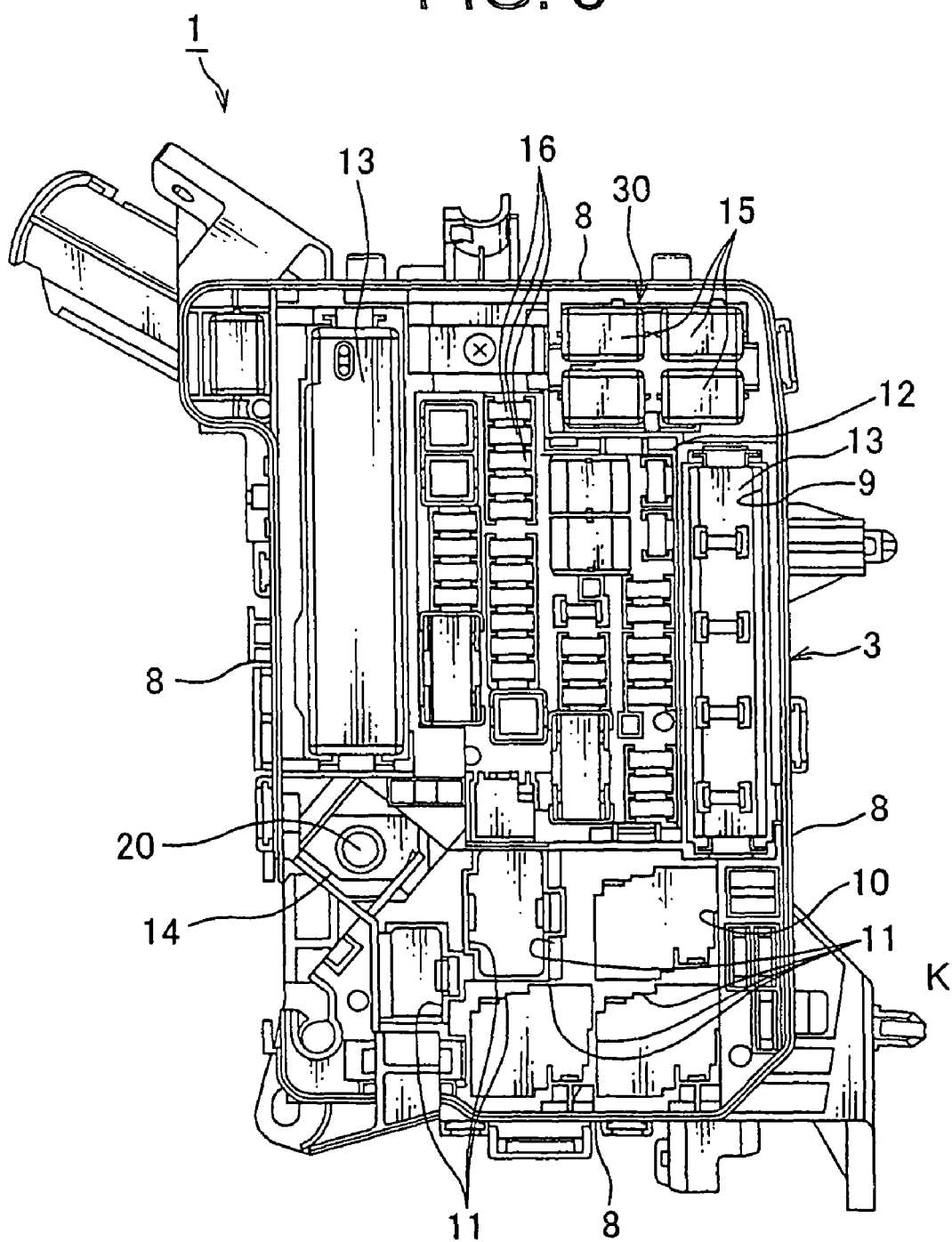
FIG. 5 is a plan view illustrating a state when a connection block is removed from a connection block attaching part of the box body of the electric junction box shown in FIG. 4.

When the electric junction box 1 is arranged in an engine room of a motor vehicle, an end part of the box body 3 situated at the front side of the motor vehicle is provided with a connection block attaching part 10 as the electric connection block. As shown in FIG. 5, the connection block attaching part 10 is partitioned into a plurality of spaces K by a plurality of partition walls 11. That is, the connection block attaching part 10 is partitioned into a plurality of spaces K provided in the box body 3.

The branching block attaching part 9 of the box body 3 is provided with a wiring block 30 as the power supply branching block.

As shown in FIGS. 1 and 2, the wiring block 30 includes a cassette block 12, two power integrations 13, a terminal attaching part 14 as the power supply connecting part provided in the cassette block 12, and busbars (not shown in the figure). The cassette block 12 is made of electrically insulating synthetic resin and molded by known injection molding. The cassette block 12 is formed in a box-shape. The cassette block 12 is inserted into the branching block attaching part 9 from below the box body 3 in FIG. 1 and received in the branching block attaching part 9, so that the cassette block 12 is attached to the box body 3.

An upper face of the cassette block 12 mounts relays 15 and fuses 16 as the electric components as shown in FIG. 14 while a lower face of the cassette block 12 fits to connectors (not shown in the figure) of a wiring harness.

The wiring harness includes a plurality of electric wires and connectors attached to ends of the electric wires. The connectors fit to the cassette block 12 and various electronic instruments mounted on the motor vehicle.

The two power integrations 13 are mounted on the upper face of the cassette block 12. Each power integration 13 mounts fuses and relays in a case thereof and branches off electric power inputted thereto through busbars so as to transmit the electric power to terminals of the connectors of the wiring harness through the fuses and relays.

The terminal attaching part 14 is located at an end of the cassette block 12. A surface of the terminal attaching part 14 is formed flat. A nut (not shown in the figure) is embedded in the terminal attaching part 14.

The terminal attaching part 14 is arranged at an end of the cassette block 12 near the connection block attaching part 10 when the cassette block 12 is received in the branching block attaching part 9.

As for the terminal attaching part 14, a connecting piece (explained later) of the busbar (not shown in the figure) and an electric contact part 18 of a terminal fitting 17 (shown in FIG. 1) connected to a battery or electric generator as the power supply are placed one upon another, and a bolt 20 (not shown in the figure), which passes through a through hole provided in the connecting piece and a hole 18a of the electric contact part 18, is screwed into the nut embedded in the terminal attaching part 14, so that the terminal attaching part 14 clamps the electric contact part 18 of the terminal fitting 17 between the connecting piece and the bolt 20, thereby attaching the terminal fitting 17 to the terminal attaching part 14.

The terminal fitting 17 is obtained by bending a thick electrically conductive sheet metal and integrally includes: the electric contact part 18 having the hole 18a; and an electric wire connecting part 19 continuing to the electric contact part 18. The electric wire connecting part 19 attaches an electric wire (not shown in the figure) connected to the power supply.

The busbar is obtained by bending an electrically conductive sheet metal and received in the cassette block 12. The busbar includes a connecting piece which is placed on the terminal attaching part 14. The busbar electrically connects the terminal attaching part 14, power integration 13, relays 15, fuses 16, and terminals of the connectors of the wiring harness according to a predetermined pattern. The busbar transmits the electric power from the power supply supplied from the terminal attaching part 14 to the terminals of the connectors of the wiring harness through relays and fuses of the power integration 13, the relays 15, and fuses 16, and branches off the electric power from the power supply to the electronic instruments.

As shown in FIG. 2, the connection block 4 includes a plurality of cassette blocks 21. Each cassette block 21 is made of electrically insulating synthetic resin and molded by known injection molding. Each cassette block 21 is formed in a box-shape. The cassette block 21 is inserted into the corresponding space K of the connection block attaching part 10 from below the box body 3 in FIG. 1 and received in the connection block attaching part 10, so that the cassette block 21 is attached to the box body 3. In an example shown in FIG. 1, when the cassette block 21 is received in the space K and attached to the connection block attaching part 10 of the box body 3, the cassette block 21 is closely placed on the partition wall 11.

Figure 4:
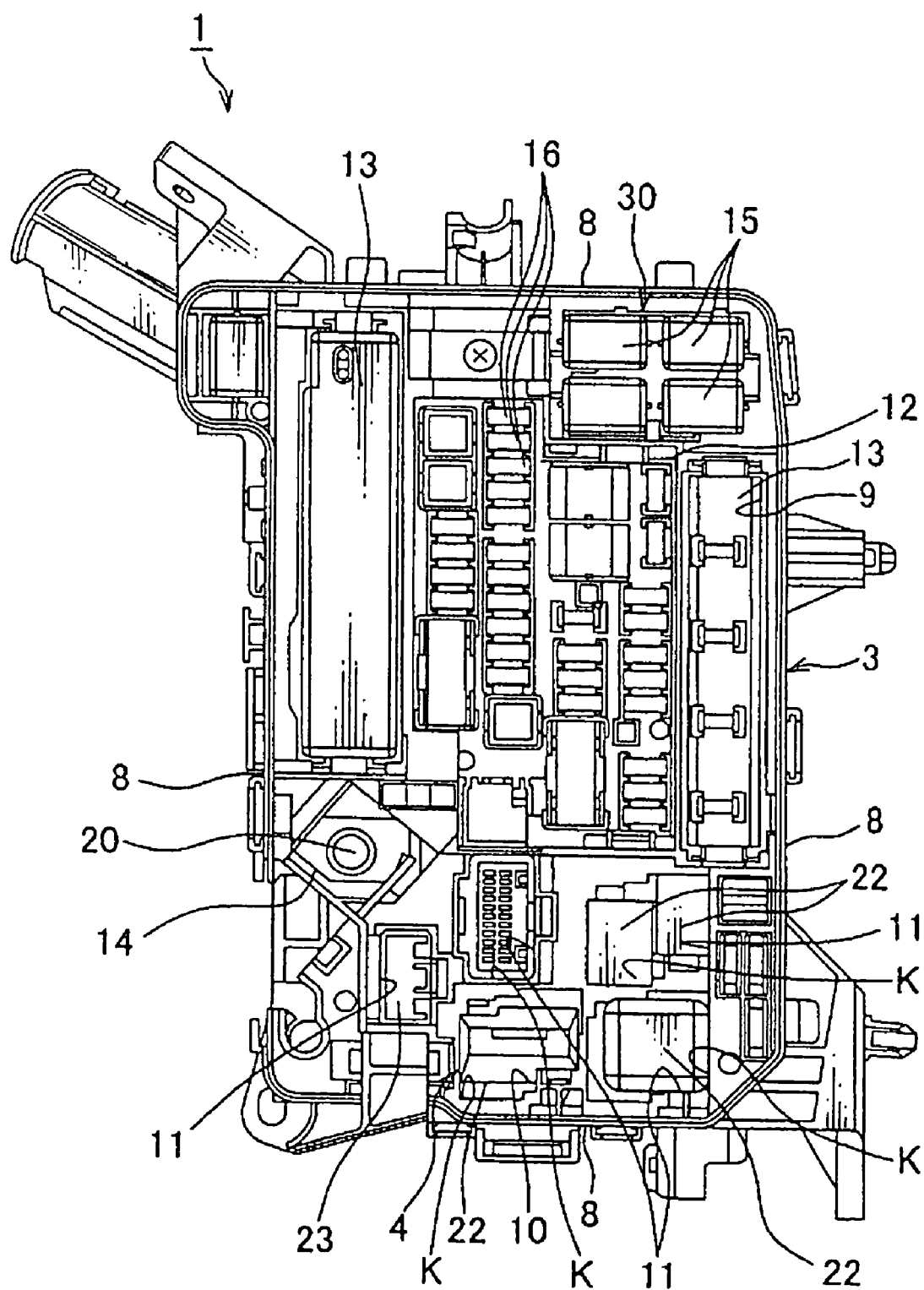
FIG. 4 is a plan view of the box body of the electric junction box shown in FIG. 2.

An upper face of the cassette block 21 mounts relays 22 and connectors 23 as the electric components for connection as shown in FIG. 4, while a lower face of the cassette block 21 fits to connectors 25 of a wiring harness 24 shown in FIG. 2. The wiring harness 24 has a similar structure to that of the wiring harness described above. Therefore, an end of at least one electric wire 26 is connected to the lower face of the cassette block 21 through a terminal fitting of the connector 25.

The upper cover 5 is made of electrically insulating synthetic resin and molded by known injection molding. The upper cover 5 includes a plurality of outer walls 27 continuing to each other and is formed in a cylindrical shape having a bottom. The upper cover 5 is attached to the box body 3 so as to cover an upper face of the box body 3.

The lower cover 6 is made of electrically insulating synthetic resin and molded by known injection molding. The lower cover 6 includes a plurality of outer walls 28 continuing to each other and is formed in a cylindrical shape having a bottom as shown in FIG. 1. The lower cover 6 is attached to the box body 3 so as to cover a lower face of the box body 3.

The side cover 7 is made of electrically insulating synthetic resin and molded by known injection molding. The side cover 7 is attached to the box body 3 so as to cover the terminal attaching part 14 of the cassette block 12 attached to the box body 3.

As shown in FIG. 3, in the electric junction box 1, the connection block attaching part 10, that is, the connection block 4 is positioned at the front of the motor vehicle while the branching block attaching part 9, that is, the wiring block 30 is positioned at the rear of the motor vehicle, wherein the electric junction box 1 is positioned at the rear of the head lamp 2 and is arranged in the engine room (that is, arranged at the front of the motor vehicle). Therefore, the terminal attaching part 14 is arranged at the rear of the connection block attaching part 10.

According to the preferred embodiment described above, since the electric connection block 10 (i.e. connection block attaching part 10) is arranged at the front side of the motor vehicle in the electric junction box 1 and the power supply connecting part 14 of the power supply branching block 30 (i.e. wiring block 30) is arranged at the rear of the electric connection block 10, therefore when the motor vehicle is subjected to a collision at the front face by another motor vehicle, the electric connection block 10 is crushed in such a manner that the spaces K between the respective partition walls 11 are crushed. Therefore, a possible damage of the power supply branching block 30, in particular, a possible damage of the power supply connecting part 14 can be reduced. Accordingly, even when the motor vehicle equipped with the electric junction box 1 is subjected to a traffic accident, the electric power can be maintained to be supplied to the electronic instruments.

Furthermore, since the cassette block 21 attaches electric components for connection such as relays 22 and connectors 23 and ends of the electric wires 26, therefore when the electric connection block 10 (i.e. connection block attaching part 10) is crushed, the cassette blocks 21, the electric components for connection, and the ends of the electric wires 26 are simultaneously crushed. Therefore, mechanical strength of the electric connection block 10 is reduced and therefore the electric connection block 10 is easily crushed in comparison with a case in which the cassette blocks 21 are formed integrally with the box body 3. That is, since the electric connection block 10 is formed so as to be easily crushed to some extent, therefore when the motor vehicle equipped with the electric junction box 1 is subjected to a traffic accident, the power supply branching block 30 can be securely prevented from being damaged.

In the preferred embodiment described above, the wiring block 30 is composed by the cassette blocks 12 and so on, which are separated from the box body 3. However, in the present invention, the cassette blocks 12 of the wiring block 30 may be formed integrally with the box body 3. Further, in the present invention, the cassette blocks 21 of the connection block 4 may be formed integrally with the box body 3.

In the preferred embodiment described above, each partition wall 11 is formed as a solid wall, that is, the partition wall 11 has no space therein. However, in the present invention, the partition wall 11 may have a space therein so that the connection block attaching part 10 is further easily crushed.

The aforementioned preferred embodiments are described to aid in understanding the present invention and variations may be made by one skilled in the art without departing from the spirit and scope of the present invention.

What is claimed is:

1. An electric junction box, which is arranged at the front in a motor vehicle, having a box body comprising:
   an electric connection block partitioned into a plurality of spaces by a plurality of partition walls, said spaces receiving respective cassette blocks and each said cassette block being connected to an end of at least one electric wire; and
   a power supply branching block having a power supply connecting part connected to the power supply and branching off electric power from the power supply to electronic instruments in the motor vehicle,
   wherein the electric connection block is located at the front side of the motor vehicle in the electric junction box and the power supply branching block is located at the rear side of the motor vehicle in the electric junction box, so that in case of a frontal collision of the motor vehicle, damage to the power supply connecting part of the power supply branching block can be reduced.

2. The electric junction box according to claim 1, wherein an electric component for connection and the end of at least one electric wire are connected to the cassette block.

* * * * *